C. Hughes.
Steam Condenser.
N° 97,405. Patented Nov. 30, 1869.
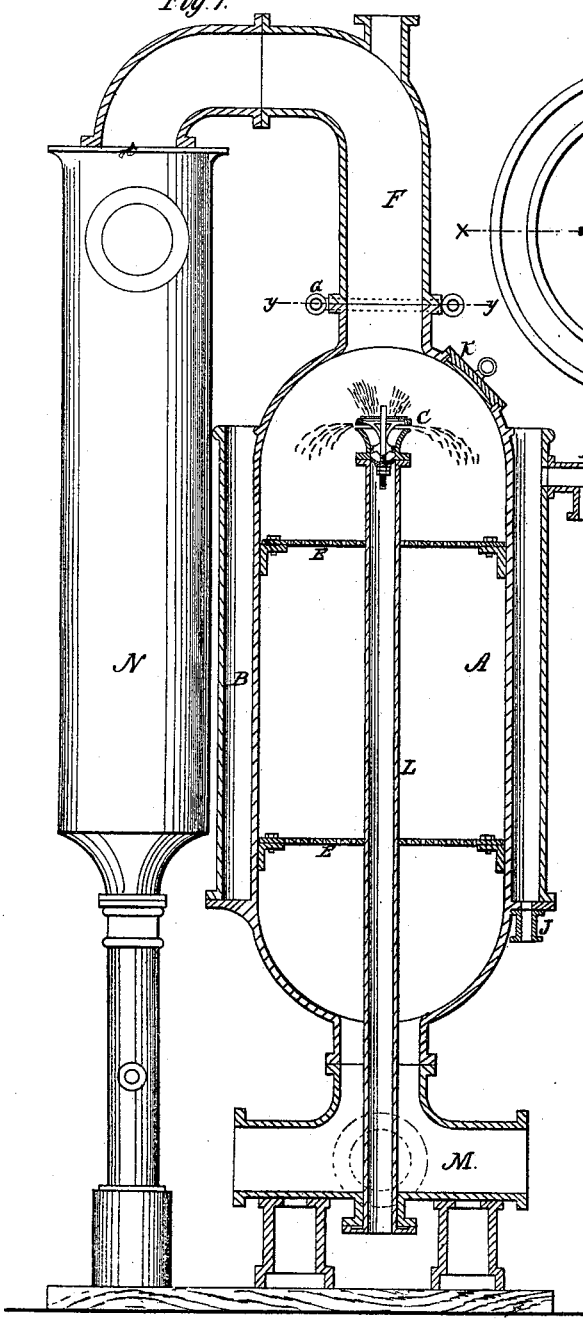
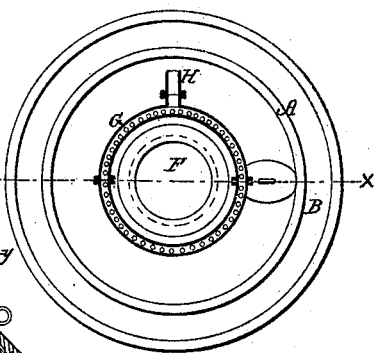

United States Patent Office.

CHARLES HUGHES, OF YNG FLOR DE CUBA, COLEN, CUBA.

Letters Patent No. 97,405, dated November 30, 1869.

IMPROVEMENT IN STEAM-CONDENSERS.

The Schedule referred to in these Letters Patent and making part of the same.

*To all whom it may concern:*

Be it known that I, CHARLES HUGHES, of Yng Flor de Cuba, Colen, Island of Cuba, have invented a new and useful Improvement in Condensers; and I do hereby declare that the following is a full, clear, and exact description thereof, which will enable others skilled in the art to make and use the same, reference being had to the accompanying drawing, forming part of this specification.

This invention relates to a new and useful improvement in condensing-vessels, whereby they may be used for either jet or surface-condensation, so as to use the water for the boiler-supply, or as injection-water, or for other purposes; and The invention consists in a tank, surrounding the condensing-vessel, and in the combination of a perforated ring-pipe with the condenser, as hereinafter more fully described.

In the accompanying drawings—

Figure 1 represents the condenser in vertical section, through the line x x of fig. 2.

Figure 2 is a horizontal section through y y, and a top view of the condenser.

Similar letters of reference indicate corresponding parts.

A is the condensing-vessel, and B is the tank around it.

C is a spray-valve, through which the injection-water is discharged.

E E represent perforated diaphragms in the condenser, for retarding and dividing the water as it falls.

F is the steam-pipe.

G is a ring-pipe, perforated with small holes through its bottom side, and placed around the steam-pipe F.

Cold water, introduced into this pipe through the pipe H, (fig. 2,) is discharged therefrom in small jets, which fall upon the upper end of the condenser, and trickle down into the tank B, and fill the tank, and convert the vessel A into a surface-condenser, producing of itself a good vacuum, without the interior valve-jet.

The water contained in the tank would, of course, become somewhat heated.

I is the overflow-pipe, but the water may be withdrawn from the cock J, for feeding the boiler, or for other purposes, so that a constant circulation is kept up.

The very large surface exposed, renders this tank very effective as a surface-condenser, and the condensed steam being pumped up into the ring-pipe and tank, may be used over and over for boiler-feed or for other purposes. Where pure water is scarce, this is a matter of great importance.

K is a man-hole, for giving access to the valve C.

L is the injection-pipe, through which the injection-water may by forced in by a force-pump or by a water-head.

The mingled injection-water and the water of condensation descend to the pipe M, from whence they are discharged, as may be desired.

It will be seen that the vessel A, in combination with the tank B, may be used for either jet or surface-condensation, or for both combined, thus adapting it to all the purposes for which condensers are required in steam-engineering.

N is a pipe from whence the exhaust-steam is discharged, and is a part of the apparatus connected with sugar-works, and has no particular relation to my condenser.

Having thus described my invention,

What I claim as new, and desire to secure by Letters Patent, is—

1. The condensing-vessel A and the annular tank B, enclosing the condenser, arranged substantially as described.

2. In combination with the condenser A, the perforated ring-pipe G, arranged substantially as described.

The above specification of my invention signed by me, this 19th day of January, 1869.

CHARLES HUGHES.

Witnesses:
A. J. MORISON,
H. R. DE LA REINTRIE.